United States Patent
Khudyakov et al.

(10) Patent No.: US 6,316,105 B1
(45) Date of Patent: Nov. 13, 2001

(54) RADIATION CURABLE COATING COMPOSITION WITH HYDROPHOBIC PROPERTIES FOR OPTICAL FIBERS AND OPTICAL FIBERS COATED THEREBY

(75) Inventors: Igor V. Khudyakov, Hickory; Bob J. Overton, Lenoir; Michael Purvis, Hickory, all of NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/361,377

(22) Filed: Jul. 27, 1999

(51) Int. Cl.$^7$ .............................. G02B 6/02; G02B 6/22; C08J 3/28; C09D 4/00
(52) U.S. Cl. .............................. 428/378; 522/85; 522/91; 522/96; 522/117; 522/137; 522/172; 522/173; 522/182; 385/145
(58) Field of Search ...................................... 385/123, 126, 385/128, 145; 428/375, 378; 522/91, 95, 85, 121, 172, 173, 174, 182, 96, 117, 137

(56) References Cited

U.S. PATENT DOCUMENTS

| | | | |
|---|---|---|---|
| 3,859,320 | * | 1/1975 | Atherton . |
| 3,869,194 | * | 3/1975 | Shiraishi et al. . |
| 4,344,649 | | 8/1982 | Uchida et al. ............... 350/96.3 |
| 4,344,669 | * | 8/1982 | Uchida et al. . |
| 4,431,264 | * | 2/1984 | Clarke . |
| 4,765,713 | | 8/1988 | Matsuo et al. . |
| 4,908,297 | | 3/1990 | Head et al. . |
| 5,024,507 | * | 6/1991 | Minns et al. . |
| 5,042,907 | * | 8/1991 | Bell et al. . |
| 5,181,268 | * | 1/1993 | Chien . |
| 5,182,786 | * | 1/1993 | Kinaga et al. . |
| 5,298,291 | | 3/1994 | Klinger et al. . |
| 5,567,794 | | 10/1996 | Barraud et al. . |
| 5,804,311 | * | 9/1998 | Suwa et al. . |
| 6,087,000 | * | 7/2000 | Girgis et al. . |

FOREIGN PATENT DOCUMENTS

| | | |
|---|---|---|
| 0711801 | 5/1996 | (EP) . |
| 0345968 | 12/1999 | (EP) . |
| 85098704 | 6/1983 | (JP) . |
| 5918259 | 10/1984 | (JP) . |
| 11236532 | 8/1999 | (JP) . |

OTHER PUBLICATIONS

Product Information Sheet from Ciba (1p), Jun., 1999.
Zonyl® Fluoroadditive PTFE TE–3667N Product Information Sheet from DuPont, 1998.
Information Sheet on Product Lines from Sartomer (9pp), Jul., 1999.
Information Sheet on Coatings and Inks from Henkel Corporation (3pp) Jun., 1999.

* cited by examiner

Primary Examiner—Susan W. Berman
(74) Attorney, Agent, or Firm—Ware, Fressola, Van Der Sluys & Adolphson LLP

(57) ABSTRACT

A radiation curable secondary coating composition for forming a secondary polymeric coating having good hydrophobic properties on a primary polymeric coating on an optical fiber is disclosed. The secondary coating composition is a mixture of a radiation curable composition capable of forming a polymeric coating, such as aliphatic difunctional and trifunctional urethane oligomers, and a hydrophobic agent selected from the group consisting of an aqueous dispersion of negatively charged hydrophobic resin particles, fluoropropylmethylcyclotrisiloxane, fluoropropylmethylsiloxarediol, trifluoropropylsiloxypolydimethylsiloxane, polybutadiene diacrylate and polybutadiene dimethacrylate.

26 Claims, 1 Drawing Sheet

RADIATION CURABLE COATING COMPOSITION WITH HYDROPHOBIC PROPERTIES FOR OPTICAL FIBERS AND OPTICAL FIBERS COATED THEREBY

BACKGROUND OF THE INVENTION

1. Field of the Invention

The present invention relates protective coatings for optical fibers. More particularly, the present invention relates to radiation curable, secondary protective liquid coating composition for optical fibers formulated to have hydrophobic properties and optical fibers coated thereby.

2. Description of the Prior Art

For many years now, optical fibers made from drawn glass have been used as a reliable transmission medium in telecommunications cables. Glass optical fibers are widely used because they have the ability to carry large amounts of information over long distances. Glass fibers are inherently strong because the glass forming the fiber has an intrinsic strength on order of $3 \times 10^9$ N/m$^2$ (Pa). See, "Optical Fibers for Transmission", J. E. Midwinter, 1979, John Wiley and sons. The retention of such strength is largely dependent upon the application environment surrounding the optical fiber. For example, if the optical fiber is subjected to an abrasive environment, the abrasion, even with micron sized particles, produces microscopic flaws in the glass surface. These flaws propogate through the glass and eventually cause a fracture of the glass fiber. Glass optical fibers can also lose strength from contact with moisture and ions in solution. It is well known that hydrolysis of the surface bonds in silica glass occurs rapidly in the presence of water containing sodium ions. The hydrolysis of the surface bonds causes significant strength deterioration.

To protect the integrity and strength of glass optical fibers from environmentally caused degradation, one or more protective polymeric coatings have been applied to the outer surface, such as the cladding, of such optical fibers, shortly after the optical fibers have been drawn from a glass preform. One purpose of the coatings is to protect the surface of the optical fiber from mechanical scratches and abrasions typically caused by subsequent handling and use. Another purpose of the coatings is to protect the glass from exposure to moisture and ions in solution. The coating or coatings may also have some influence over the fiber's optical characteristics because the coatings are physically responsive to external mechanical forces and temperature.

The coating compositions applied to the optical fiber are typically viscous liquid, radiation curable compositions. Typically, the coating compositions are cured on the optical fiber by exposing the coating composition to ultraviolet radiation, electron beam radiation or ionizing radiation for a predetermined period of time deemed suitable for effective curing.

Fluorinated UV radiation curable secondary coatings have been provided over optical fibers to repel water and moisture. See generally U.S. Pat. Nos. 4,908,297, 5,298,291, and 5,567,794. The coatings disclosed in these patents are relatively expensive because the fluorinated raw materials which provide water repelling properties are relatively expensive. Accordingly, it is desirable to have a secondary coating having water repelling properties and good adhesion to the primary coating which is also relatively inexpensive.

SUMMARY OF THE INVENTION

It is an object of the present invention to provide a relatively inexpensive radiation curable liquid coating composition for application to an optical fiber which has good hydrophobic properties and good mechanical properties over an underlying primary coating on the optical fiber.

This object is accomplished, at least in part, by providing a radiation curable secondary coating composition for forming a secondary coating having hydrophobic properties on a primary coating on an optical fiber, the secondary coating composition comprising a mixture of: a radiation curable composition capable of forming a polymeric coating, and a hydrophobic agent selected from the group consisting of a negatively charged hydrophobic colloid of resin particles suspended in water, fluoropropylmethylcyclotrisiloxane, fluoropropylmethylsiloxanediol, trifluoropropylsiloxypolydimethylsiloxane, polybutadiene diacrylate and polybutadiene dimethacrylate.

DETAILED DESCRIPTION OF THE PRESENT INVENTION

Figure 1:
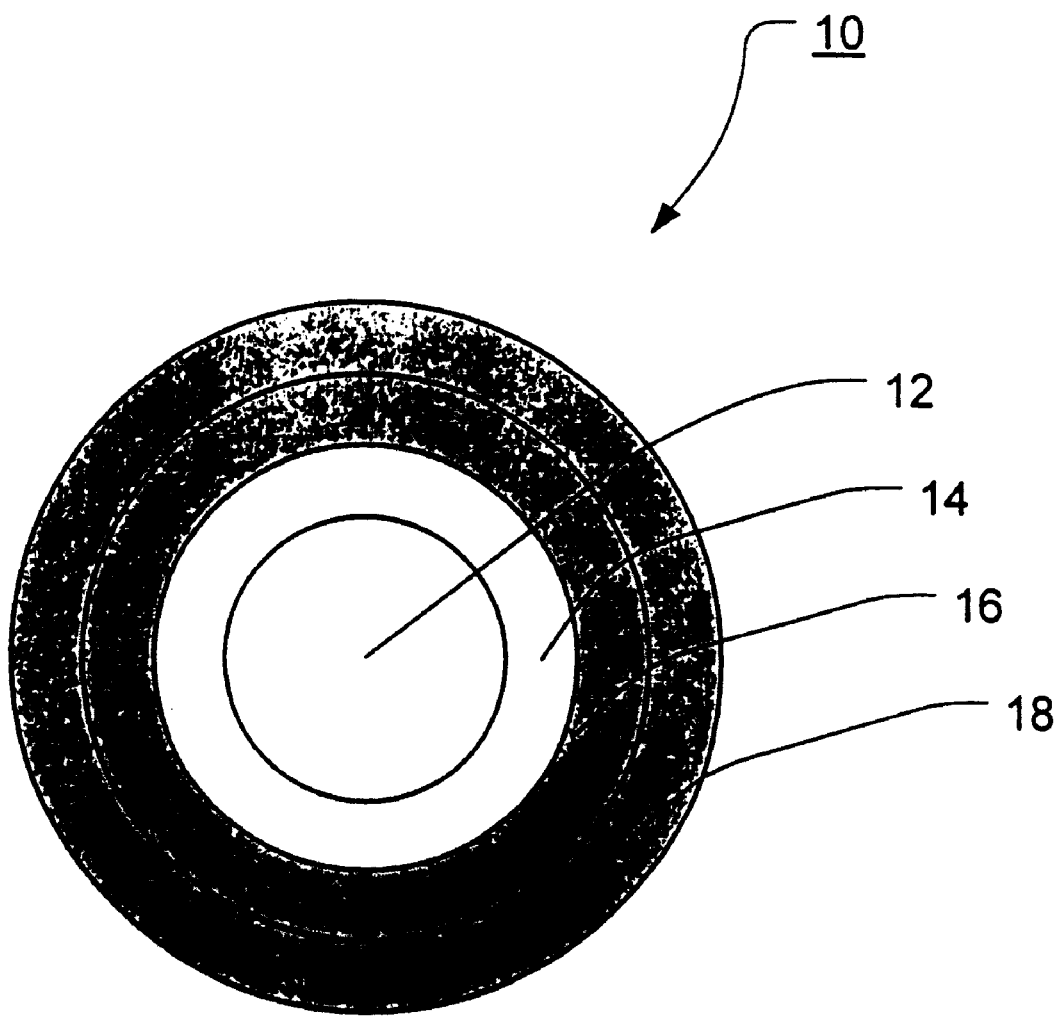
FIG. 1, which is a cross-sectional schematic diagram of an optical fiber having a two protective coatings thereon.

Typical telecommunications elements include an elongated transmission medium such as a metallic wire or an optical fiber. Referring to FIG. 1, a typical optical fiber 10 transmission medium is shown. The typical optical fiber 10 is formed by a glass core 12 which is surrounded by a glass cladding 14. The glass cladding 14 of the optical fiber 10 is usually surrounded by one or more protective polymeric coatings. For example, as shown in FIG. 1, an inner protective polymeric coating 16 is applied over the cladding 14 and an outer protective polymeric coating 18 is applied over the inner coating 16. The inner 16 and outer 18 protective coatings may also be referred to as inner primary and outer primary coatings or primary and secondary coatings. The inner coating 16 is usually obtained by applying a radiation curable (polymerizable) composition over the cladding 14. The radiation curable composition is normally applied by passing the optical fiber through a first die or a coating applicator using techniques well known in the art, and therefore, not described herein. Once the radiation curable composition is applied over the cladding 14, the composition may be cured by exposing it to radiation, such as ultraviolet radiation, electron beam radiation or ionizing radiation, to initiate curing (polymerization) thereof. Ultraviolet radiation is most commonly used. The application and curing of the radiation curable composition to form the inner coating 16 is typically followed by the application and curing of a radiation curable composition capable of forming a polymeric coating which forms the outer or secondary coating 18. This sequence is known as a wet-on-dry application of the outer coating 18. Alternatively, the application of the radiation curable composition which forms the inner coating 16 may be directly followed by the application of the radiation curable composition forming the outer coating 18 prior to exposure to the curing radiation. This is known in the art as a wet-on-wet application. Each application technique is well known in the art.

Typically, the commercially preferred radiation curable compositions for forming primary and secondary coatings on optical fibers include aliphatic difunctional and trifunctional urethane acrylates. These preferred radiation curable compositions may be diluted with reactive diluents such as tripropylene glycol diacrylate and may include photoinitiators to improve the curing process. There are a variety of photo-intiators marketed by Ciba under the trademarks Irgacure or Darocur that will work for the present invention.

Those skilled in the art will appreciate that the hydrophobic or water repelling properties of a coating are typically determined by measuring the contact angle between a water drop placed on the coating and the coating surface with a goniometer. Basic cured secondary coatings formed with aliphatic urethane diacrylate and triacrylate oligomers typically exhibit a contact angle of about 45 degrees. According to the present invention, the hydrophobic properties of the basic cured secondary coating can be significantly improved by adding to the radiation curable composition a small quantity of a hydrophobic agent such as an aqueous dispersion of hydrophobic polymeric resin particles, fluoropropylmethylcyclotrisiloxane, fluoropropylmethylsiloxanediol, trifluoropropylsiloxypolydirnethylsiloxane, or polybutadiene di(meth)acrylate. With the addition of one or more of these materials, the hydrophobicity of the resulting cured coating can be greatly increased as exhibited by a larger measured contact angle. Examples of secondary coating composition having good hydrophobic or water repelling properties made according to the present invention follow below.

EXAMPLE 1

A basic secondary radiation curable composition capable of forming a polymeric secondary coating was prepared, in part, by mixing 180 grams of Ebecryl™ 4866, which is an aliphatic urethane triacrylate oligomer diluted with 30 weight percent tripropylene glycol diacrylate (TRPGDA) produced by UCB Chemicals, 33 grams of Photomer™ 6010, which is an aliphatic urethane diacrylate oligomer produced by Henkel, 65 grams of TRPGDA produced by UCB Chemicals, and 14 grams Darocur™ 4265, which is a 50:50 weight percent mixture of diphenyl-2,4,6-trimethylbenzoyl phosphine oxide and 2-hydroxy-2-methyl-1-phenylpropane-1-one photoinitator produced by Cib. Those skilled in the art will appreciate that the relative amounts of the aliphatic urethane acrylate oligomers and reactive diluents may be adjusted as required to obtain a basic secondary radiation curable composition having a viscosity which is suitable for application over a primary coating on an optical fiber. The basic secondary radiation curable composition was applied over a typical ultra violet radiation cured primary coating on a test piece and subjected to ultraviolet radiation in an Iwasaki processor with a UV radiation exposure of $1.0 \text{ J/cm}^2$. After curing, the secondary radiation curable composition provided a secondary coating in which the contact angle measured between a drop of water on the surface of this coating and the surface measured approximately 66 degrees. The basic coating exhibited a modulus of about 30 to 60 MPa, a $T_g$ of about 30 to 60° C. and an elongation to break of about 10 to 30 percent.

EXAMPLE 2

A basic secondary radiation curable composition capable of forming a polymeric secondary coating was prepared as described in Example 1. Approximately 15.5 grams (about 5 weight percent of the total composition) of Zonyl™ TE-3667N, which is an aqueous dispersion of negatively charged hydrophobic polymeric resin particles produced by DuPont, was thoroughly mixed into the above basic composition to produce a modified secondary coating composition according to the present invention suitable for application over a primary coating on an optical fiber. The polymeric resin particles in the Zonyl™ aqueous dispersion are a fluoropolymer, such as polytetrafluoroethylene, and range in size between 0.05 and 0.5 microns, with an average size of about 0.22 microns. The resin particles comprise approximately 58 to 62 weight percent of the colloid. The Zonyl™ aqueous dispersion includes one or more surfactants such as octyl phenoxypolyethoxyethanol and nonyl phenoxypolyethoxyethanol and the surfactants make up to approximately 5 weight percent of the colloid. Also, the aqueous dispersion further includes ammonium perfluorooctanoate in an amount up to approximately 0.5 weight percent of the colloid.

The modified secondary coating composition with the Zonyl™ aqueous dispersion was stirred with a mechanical stirrer for about 30 minutes. After stirring, the composition was sonicated for about 30 minutes to remove entrapped air bubbles. The modified secondary coating composition was applied over a typical radiation cured primary coating on a test piece and subjected to ultraviolet radiation in an Iwasaki processor with a UV radiation exposure of $1.0 \text{ J/cm}^2$. After curing, the modified secondary coating composition provided a hydrophobic coating. The contact angle measured between a drop of water on the surface and the surface of this coating measured approximately 66 degrees. The coating exhibited a modulus of about 30 to 60 MPa, a $T_g$ of about 30 to 60° C. and an elongation to break of about 10 to 30 percent. All of these properties are suitable for a secondary coating for an optical fiber.

EXAMPLE 3

A basic secondary radiation curable composition capable of forming a polymeric secondary coating was prepared as described in Example 1. Approximately 15.5 grams (about 5 weight percent of the total composition) of a trifluoropropyl copolymer vinyl stopped fluid marketed by General Electric under the product number FF160 was added to the basic secondary composition. The vinyl stopped fluid is a proprietary mixture containing approximately 80 to 99 weight percent trifluoropropylsiloxypolydimethylsiloxane.

The secondary coating composition with the vinyl stopped fluid was stirred with a mechanical stirrer for about 30 minutes. After stirring, the composition was sonicated for about 30 minutes to remove entrapped air bubbles. The secondary coating composition was applied over a typical radiation cured primary coating on a test piece and subjected to ultraviolet radiation in an Iwasaki processor with a UV radiation exposure of $1.0 \text{ J/cm}^2$. After curing, the resulting secondary coating composition provided a hydrophobic coating. The contact angle measured between a drop of water on the surface and the surface of this coating measured approximately 75 degrees. The coating exhibited a modulus of about 30 to 60 MPa, a $T_g$ of about 30 to 60° C. and an elongation to break of about 10 to 30 percent, indicating no loss of mechanical properties due to the addition of the vinyl stopped fluid. As stated above, all of these properties are suitable for a secondary coating for an optical fiber.

EXAMPLE 4

A basic secondary radiation curable composition capable of forming a polymeric secondary coating was prepared as described in Example 1. Approximately 15.5 grams (about 5 weight percent of the total composition) of a trifluoropropyl silanol stopped fluid marketed by General Electric under the product number FF7149 was added to the basic secondary coating composition to form a modified secondary coating composition. The silanol stopped fluid is a proprietary mixture containing approximately 10 to 30 weight percent fluoropropylmethylcyclotrisiloxane and up to 80 to 99 weight percent fluoropropylmethylsiloxanediol.

As in the other examples, the modified secondary coating composition with the silanol stopped fluid was stirred with a mechanical stirrer for about 30 minutes. After stirring, the modified composition was sonicated for about 30 minutes to remove entrapped air bubbles. The resulting modified secondary coating composition was applied over a typical radiation cured primary coating on a test piece and subjected to ultraviolet radiation in an Iwasaki processor with a UV radiation exposure of 1.0 J/cm$^2$. After curing, the modified secondary coating composition provided a hydrophobic coating. The contact angle measured between a drop of water on the surface of this coating measured approximately 71 degrees. The coating exhibited a modulus of about 30 to 60 MPa, a $T_g$ of about 30 to 60° C. and an elongation to break of about 10 to 30 percent, indicating no loss of mechanical properties due to the addition of the silanol stopped fluid. As stated above, all of these properties are suitable for a secondary coating for an optical fiber.

EXAMPLE 5

A basic secondary radiation curable composition capable of forming a polymeric secondary coating was prepared as described in Example 1. Approximately 15.5 grams (about 5 weight percent of the total composition) of a polybutadiene di(meth)acrylate oligomer diluted with about 20 weight percent of 1,6 hexanediol diacrylate (HDDA) marketed by Sartomer under the product designation CN301 was added to the basic secondary radiation curable composition to form a modified secondary coating composition.

Similar to the examples, the modified secondary coating composition with the polybutadiene di(meth)acrylate oligomer was stirred with a mechanical stirrer for about 30 minutes. After stirring, the composition was sonicated for about 30 minutes to remove entrapped air bubbles. The modified secondary coating composition was applied over a typical radiation cured primary coating on a test piece and subjected to ultraviolet radiation in an Iwasaki processor with a UV radiation exposure of 1.0 J/cm$^2$. After curing, the resulting secondary coating composition provided a hydrophobic coating. The contact angle measured between a drop of water on the surface and the surface of this coating measured approximately 80 degrees. The coating exhibited a modulus of about 30 to 60 MPa, a $T_g$ of about 30 to 60° C. and an elongation to break of about 10 to 30 percent, indicating no loss of mechanical properties due to the addition of the polybutadiene di(meth)acrylate oligomer. As stated above, all of these properties are suitable for a secondary coating for an optical fiber.

EXAMPLE 6

It was observed that oxidation products of the HDDA reactive diluent in the composition described in Example 5 imparted some color to the resulting coating. Although the physical properties of the resulting coating made according to composition of Example 5 were found to be satisfactory, in some optical fiber applications, the color imparted by the HDDA reactive diluent oxidation products may not be desirable. Accordingly, a modified coating composition using a slightly different polybutadiene based acrylate hydrophobic agent was formulated to overcome the coloration of the coating. The composition is described below.

A basic secondary radiation curable composition capable of forming a polymeric secondary coating was prepared as described in Example 1. Approximately 15.5 grams (about 5 weight percent of the total composition) of a polybutadiene diacrylate oligomer marketed by Sartomer under the product designation CN302 was added to the basic secondary composition to form a modified coating composition.

Similar to the other examples, the modified secondary coating composition with the polybutadiene diacrylate oligomer was stirred with a mechanical stirrer for about 30 minutes. After stirring, the modified composition was sonicated for about 30 minutes to remove entrapped air bubbles. The modified secondary coating composition was applied over a typical radiation cured primary coating on a test piece and subjected to ultraviolet radiation in an Iwasaki processor with a UV radiation exposure of 1.0 J/cm$^2$. After curing, the resulting secondary coating composition provided a hydrophobic coating. The contact angle measured between a drop of water on the surface and the surface of this coating measured approximately 85 degrees. The coating exhibited a modulus of about 30 to 60 MPa, a $T_g$ of about 30 to 60° C. and an elongation to break of about 10 to 30 percent, indicating no loss of mechanical properties due to the addition of the polybutadiene di(meth)acrylate oligomer. As stated above, all of these properties are suitable for a secondary coating for an optical fiber.

In accordance with the present invention, the secondary coating composition of the present invention can be applied over a primary coating on an optical fiber according to well known techniques. For example, the secondary coating composition can be applied over a primary coating by passing the optical fiber with primary coating through a die or coating applicator. The secondary coating composition is also supplied to the die or coating applicator. Once the uncured secondary coating composition is applied over the primary coating on the optical fiber, the secondary coating composition is exposed to sufficient radiation, such as ultraviolet radiation, to cure the secondary coating composition. Typically, the ultraviolet radiation is provided by passing the coated optical fiber through one or more ultraviolet radiation lamps which provide ultraviolet radiation in a suitable wavelength range and at a suitable intensity to cure the secondary coating composition.

It can be seen from the foregoing disclosure and example that the present invention offers substantial advantages over the prior art in terms of cost. The embodiment disclosed herein achieve the object of the invention; however, it should be appreciated by those skilled in the art that departures can be made from the following claims without parting from the spirit and scope of the invention.

What is claimed is:

1. A radiation curable secondary coating composition for forming a secondary polymeric coating having hydrophobic properties over a primary coating on an optical fiber, the composition comprising a mixture of:
   an aliphatic urethane diacrylate or triacrylate oligomer material; and
   a hydrophobic agent selected from the group consisting of an aqueous dispersion comprised of negatively charged hydrophobic fluoropolymer resin particles and a surfactant, fluoropropylmethylcyclotrisiloxane, fluoropropylmethylsiloxanediol and trifluoropropylsiloxypolydiinethylsiloxane.

2. The secondary coating composition of claim 1, wherein the hydrophobic agent comprises up to approximately 5 weight percent of the mixture.

3. The coating composition of claim 1, wherein the urethane oligomer material is an aliphatic urethane triacrylate oligomer.

4. A radiation curable coating composition for forming a secondary polymeric coating having hydrophobic properties over a primary coating on an optical fiber, the composition comprising a mixture of:
  an aliphatic urethane oligomer material comprising a mixture of urethane triacrylate oligomer and urethane diacrylate oligomer; and
  a hydrophobic agent selected from the group consisting of an aqueous dispersion comprised of negatively charged hydrophobic fluoropolymer resin particles and a surfactant, fluoropropylmethylcyclotrisiloxane, fluoropropylmethylsiloxanediol, trifluoropropylsiloxypolydimetylsiloxane, polybutadiene diacrylate and polybutadiene dimethacrylate.

5. The secondary coating composition of claim 4, wherein the radiation curable composition further includes tripropylene glycol diacrylate.

6. The coating composition of claim 1, wherein the fluoropolymer is polytetrafluoroethylene.

7. The secondary coating composition of claim 6, wherein the resin particles range in size between 0.05 and 0.5 microns.

8. The secondary coating composition of claim 7, wherein the average particle size is approximately 0.22 microns.

9. The secondary coating composition of claim 8, wherein the resin particles comprise approximately 58 to 62 weight percent of the aqueous dispersion.

10. The secondary coating composition of claim 9, wherein the aqueous dispersion further comprises a surfactant selected from the group of consisting of octyl phenoxypolyethoxyethanol and nonyl phenoxypolyethoxyethanol.

11. The secondary coating composition of claim 10, wherein the surfactant is present in the aqueous dispersion in an amount up to approximately 5 weight percent of the dispersion.

12. The secondary coating composition of claim 11, wherein the aqueous dispersion further comprises ammonium perfluorooctanoate in an amount up to approximately 0.5 weight percent of the aqueous dispersion.

13. An optical fiber comprising:
  a core;
  a cladding surrounding the core;
  a primary polymeric coating surrounding the cladding; and
  a secondary polymeric coating surrounding the primary polymeric coating, wherein the secondary polymeric coating is obtained by:
  applying a secondary radiation coating composition comprising a mixture of a urethane diacrylate or triacrylate oligomer material and a hydrophobic agent selected from the group consisting of an aqueous dispersion comprised of negatively charged hydrophobic fluoropolymer resin particles and a surfactant, fluoropropylmethylcyclotrisiloxane, fluoropropyhnethylsiloxanediol and trifluoropropylsiloxypolydimethylsiloxane; and
  exposing the secondary coating composition to curing radiation to cause the applied secondary coating composition to cure over the primary coating.

14. The optical fiber of claim 13, wherein the hydrophobic agent comprises approximately 5 weight percent of the mixture.

15. The optical fiber of claim 14, wherein the urethane oligomer material is a aliphatic urethane triacrylate oligomer.

16. An a optical fiber comprising:
  a core;
  a cladding surrounding the core;
  a primary polymeric coating surrounding the cladding; and
  a secondary polymeric coating surrounding the primary polymeric coating, wherein the secondary polymeric coating is obtained by:
  applying a secondary radiation coating composition comprising a mixture of urethane diacrylate oligomer and urethane triacrylate oligomer and approximately 5 weight percent, based on the weight of the mixture, of a hydrophobic agent selected from the group consisting of an aqueous dispersion comprised of negatively charged hydrophobic fluoropolymer resin particles and a surfactant, flaoropropylmethylcyclotrisiloxane, fluoropropylmethylsiloxanediol and trifluoropropylsiloxypolydimethylsiloxane, polybutadiene diacrylate and polybutadiene dimethacrylate; and
  exposing the secondary coating composition to curing radiation to cause the applied secondary coating composition to cure over the primary coating.

17. The optical fiber of claim 16, wherein the radiation curable composition further includes tripropylene glycol diacrylate.

18. The optical fiber of claim 13, wherein the fluoropolymer is polytetrafluoroethylene.

19. The optical fiber of claim 18, wherein the resin particles range in size between 0.05 and 0.5 microns.

20. The optical fiber of claim 19, wherein the average particle size is approximately 0.22 microns.

21. The optical fiber of claim 20, wherein the resin particles comprise approximately 58 to 62 weight percent of the colloid.

22. The optical fiber of claim 21, wherein the aqueous dispersion further comprises a surfactant selected from the group of consisting of octyl phenoxypolyethoxyethanol and nonyl phenoxypolyethoxyethanol.

23. The optical fiber of claim 22, wherein the surfactant is present in the aqueous dispersion in an amount up to approximately 5 weight percent of the aqueous dispersion.

24. The optical fiber of claim 23, wherein the aqueous dispersion further comprises ammonium perfluorooctanoate in an amount up to approximately 0.5 weight percent of the aqueous dispersion.

25. A method for forming a secondary polymeric coating having good water repelling properties over a primary coating on an optical fiber, the method comprising the steps of:
  providing an optical fiber having a core, a cladding surrounding the core, and a primary coating surrounding the cladding;
  applying a secondary coating composition over the primary coating, the secondary composition comprising a mixture of:
  an aliphatic diacrylate or triacrylate urethane oligomer material, and
  a hydrophobic agent selected from the group consisting of an aqueous dispersion comprised of negatively charged hydrophobic fluoropolymer resin particles and a surfactant, fluoropropylmethylcyclotrisiloxane, fluoropropylmethylsiloxanediol and trifluoropropylsiloxypolydimeltylsiloxane; and
  exposing the secondary coating composition to curing radiation of a suitable intensity, wavelength and duration to cause the applied secondary coating composition to cure over the primary coating.

26. The method of claim 25, wherein the hydrophobic agent comprises approximately 5 weight percent of the mixture.

* * * * *